(12) United States Patent
Eberhardt

(10) Patent No.: US 9,542,842 B2
(45) Date of Patent: Jan. 10, 2017

(54) DEVICE AND METHOD FOR DETECTING WETNESS ON A ROADWAY

(71) Applicant: Dr. Ing. h.c. F. Porsche Aktiengesellschaft, Stuttgart (DE)

(72) Inventor: Stefan Eberhardt, Backnang (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/721,308

(22) Filed: May 26, 2015

(65) Prior Publication Data

US 2015/0339922 A1 Nov. 26, 2015

(30) Foreign Application Priority Data

May 26, 2014 (DE) .................. 10 2014 107 358

(51) Int. Cl.
| | | |
|---|---|---|
| G08G 1/09 | (2006.01) | |
| G08G 1/0967 | (2006.01) | |
| B60Q 1/08 | (2006.01) | |
| B60S 1/08 | (2006.01) | |
| B60W 40/06 | (2012.01) | |
| B60R 16/023 | (2006.01) | |

(52) U.S. Cl.
CPC .............. *G08G 1/0967* (2013.01); *B60Q 1/085* (2013.01); *B60R 16/0237* (2013.01); *B60S 1/0825* (2013.01); *B60S 1/0851* (2013.01); *B60W 40/06* (2013.01)

(58) Field of Classification Search
CPC .... B60Q 1/085; B60R 16/0237; B60S 1/0825; B60S 1/0851

USPC ......................................... 340/905, 601, 602
See application file for complete search history.

(56) References Cited

U.S. PATENT DOCUMENTS

| 5,900,821 A | 5/1999 | Petzold |
|---|---|---|
| 9,272,676 B2 * | 3/2016 | Heger .................. B60Q 1/085 |
| 2013/0332028 A1 | 12/2013 | Heger et al. |

FOREIGN PATENT DOCUMENTS

| CH | 701 327 | 12/2010 |
|---|---|---|
| DE | 196 19 116 | 11/1997 |
| DE | 10 2007 037 993 | 2/2009 |
| DE | 10 2010 063 017 | 6/2012 |
| JP | 2009032194 | 2/2009 |
| JP | 2010249531 | 11/2010 |
| JP | 2010257307 | 11/2010 |
| JP | 2011232050 | 11/2011 |
| JP | 2013103615 | 5/2013 |

OTHER PUBLICATIONS

German Search Report of Feb. 23, 2015.

\* cited by examiner

*Primary Examiner* — John A Tweel, Jr.
(74) *Attorney, Agent, or Firm* — Gerald E. Hespos; Michael J. Porco; Matthew T. Hespos

(57) ABSTRACT

A detection device is provided for a motor vehicle (10) for detecting wetness (18) on a roadway (20). The detection device has a moisture-detection unit (12) and an evaluation unit (40) designed to determine wetness (18) on the roadway (20) on the basis of a moisture value (42) detected by the moisture-detection unit (12). The moisture-detection unit (12) is embodied as a sensor unit and is arranged at a rear region of the motor vehicle (10).

16 Claims, 1 Drawing Sheet

DEVICE AND METHOD FOR DETECTING WETNESS ON A ROADWAY

CROSS REFERENCE TO RELATED APPLICATION

This application claims priority under 35 USC 119 to German Patent Appl. No. 10 2014 107 358.4 filed on May 26, 2014, the entire disclosure of which is incorporated herein by reference.

BACKGROUND

1. Field of the Invention

The invention relates to a detection device for a motor vehicle for detecting wetness on a roadway. The device has a moisture-detection unit and an evaluation unit that is designed to determine wetness on the roadway on the basis of a moisture value that is detected by the moisture-detection unit. The invention also relates to a method for detecting wetness on a roadway.

2. Description of the Related Art

Wetness on a roadway constitutes a high hazard potential for motor vehicles since aquaplaning can occur and hazardous situations can arise as a result of veering off of the vehicle, as a function of the quantity of moisture and the speed of the motor vehicle.

Sensors therefore are developed to determine or estimate the risk of aquaplaning for a motor vehicle in a simple way. Known systems use signals of rain sensors in the front windshield and the corresponding wiper activities to estimate the moisture on the roadway. However, such systems are subject to an uncertainty since the detected moisture on the front windshield can be thrown up by vehicles traveling in front or precipitation occurring in the stationary state of the motor vehicle cannot be detected.

Other communication systems warn of hazards due to aquaplaning in which other vehicles detect the hazard and make available a hazard warning, for example via a radio link. However, such systems have a delay in the warning and require at least one vehicle that has entered the hazardous situation to communicate a corresponding warning.

A corresponding hazard warning in navigation maps does not take into account the current weather situation. Thus, such systems also have large uncertainty.

DE 10 2010 063 017 A1 discloses a driving assistance system for detecting wetness on a roadway, in which system a trail of spray of the motor vehicle is detected by a camera and the risk of aquaplaning is estimated on the basis of the trail of spray. A disadvantageous of this system is that the technical expenditure for the driving assistance system is very high, and the detection of the trail of spray at the rear results in a delay in the measurement, and hence a further uncertainty factor.

The object of the invention is therefore to provide an improved device for a motor vehicle which can determine wetness on a roadway with little technical expenditure and increased reliability. In addition, an object of the invention is to make available a corresponding method for detecting wetness on a roadway.

SUMMARY OF THE INVENTION

The object is achieved with a sensor unit arranged at a rear region of the motor vehicle. The object also is achieved with a method that detects a moisture value by means a sensor unit at a rear region of a motor vehicle, and the wetness on the roadway is determined on the basis of the detected moisture value.

As a result of the fact that the current moisture value is detected at the rear region of the motor vehicle, spray water that is thrown up by the motor vehicle can be reliably determined with low technical expenditure. Therefore the object of the invention is achieved.

The evaluation unit may be connected to a position-detection unit for determining a current position of the vehicle and is designed to determine the wetness on the roadway on the basis of the detected moisture value and a current position of the motor vehicle. As a result, potential hazard locations with respect to aquaplaning can be made available to the evaluation unit and can be compared with potential hazard locations by means of the current position of the motor vehicle. Thus, uncertainty factors can be reduced and aquaplaning risks can be determined reliably in real time.

The position-detection unit may be designed to make available to the evaluation unit roadway information of the current position of the motor vehicle. The evaluation unit also may be designed to estimate in a predictive fashion aquaplaning hazard situations present on a subsequent route. As a result of this estimation, aquaplaning hazard situations that are located on the subsequent route also can be taken into account at a correspondingly early time.

The position-detection unit may be designed to call the roadway information from a database or a data memory and make it available to the evaluation unit. As a result, detection of the wetness on the roadway can be made available in real time.

The roadway information may comprise information relating to aquaplaning properties of the roadway. As a result, a possible risk of aquaplaning can be determined directly with a short delay and low technical expenditure.

The evaluation unit may be designed to make available a warning signal on the basis of the determined wetness. As a result, a driver of the vehicle can be informed about the risk of aquaplaning so that safety of the vehicle occupants is increased further.

A bodywork of the motor vehicle may be embodied so that spray water of the motor vehicle is precipitated on the surface of the rear region. Thus, a spray value of the driver's own vehicle can be determined reliably with technically low expenditure.

The moisture-detection unit may be designed to detect moisture on the surface of the rear region on which the moisture-detection unit is arranged. As a result, the spray can be determined reliably, since the spray is precipitated as spray water on the surface of the rear region.

The moisture-detection unit may have a rain sensor assigned to a rear windshield of the motor vehicle and is designed to detect moisture on the surface of the rear windshield. As a result, the technical expenditure for the moisture-detection unit can be reduced further, since rain sensors can reliably detect moisture on the surface of the rear windshield with technically low expenditure.

The moisture-detection unit may be assigned a wiper element that is designed to remove moisture from the surface. The reliability of the moisture-detection unit can be increased, since the detected surface region is cleaned continuously and the moisture impacting on the surface can be detected continuously.

The moisture value may be determined on the basis of an interval period of the wiper element. As a result, the technical expenditure for determining the moisture value can be reduced further.

The roadway information may have a threshold value for the measured moisture value. The threshold value forms an aquaplaning hazard threshold. Thus, a hazard potential can be determined with little expenditure as a function of the position, for example empirical values.

The invention increases the reliability of the detection of wetness on a road with low technical expenditure, since potential hazard locations can be detected by the detected current position of the vehicle, and a quantity of water on the roadway can be estimated in conjunction with the detected moisture. As a result, the uncertainty of known systems can be reduced, and the safety of the vehicle occupants can be increased.

Of course, the features that are mentioned above and the features that are still to be explained below can be used in the respectively specified combination but also in other combinations or alone without departing from the scope of the invention.

Exemplary embodiments of the invention are illustrated in the drawings and explained in more detail in the following description.

DETAILED DESCRIPTION OF THE PREFERRED EMBODIMENTS

Figure 1:
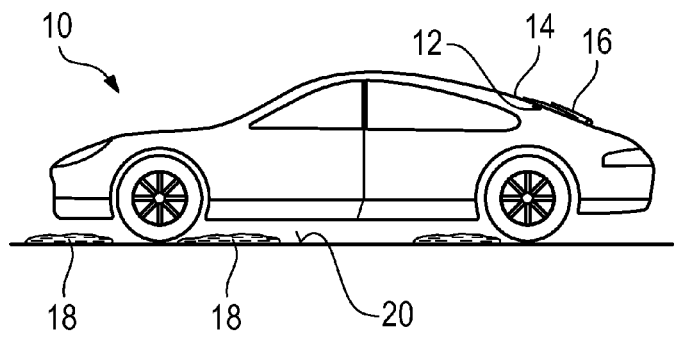
FIG. 1 is a schematic illustration of a motor vehicle having a device for detecting wetness on the roadway.

A motor vehicle in accordance with the invention is identified by the numeral 10 in FIG. 1. The motor vehicle 10 has a rain sensor as a moisture-detection device 12. The rain sensor is arranged at a rear region of the motor vehicle 10, in particular on a rear windshield 14, to detect moisture such as rain or spray water or spray on the rear windshield 14. The rear windshield has a rear wiper 16 that is designed to wipe over the rear windshield 14 and correspondingly remove moisture and dirt from the rear windshield 14. The rear wiper 16 is controlled on the basis of a signal of the rain sensor 12 or an interval period of the rear wiper 16 is set on the basis of a signal of the rain sensor 12, to remove moisture on the rear windshield 14 and at the rain sensor 12.

Wetness 18 may be thrown up from a roadway 20 while the motor vehicle 10 is traveling and may be precipitated as spray water or spray on the rear region and, in particular, on the rear windshield 14. As a result, the signal detected by the rain sensor 12 forms a measure of the wetness 18 on the roadway 20.

The signal of the rain sensor 12 is evaluated and is combined with information about the roadway 20, for example from a navigation system, to determine the quantity of wetness 18 and a risk of skidding or aquaplaning arising therefrom. The wetness 18 on the roadway 20 determined in this way and the resulting risk of aquaplaning can be made available to a vehicle controller and/or driving assistance system to prevent the vehicle from veering off, or can be communicated to the driver as a warning signal.

Of course, the bodywork of the vehicle 10 must have a shape so that the wetness 18 that is thrown up by the tires is precipitated on the rear windshield 14 so that the spray water can be detected by the rain sensor 12.

Figure 2:
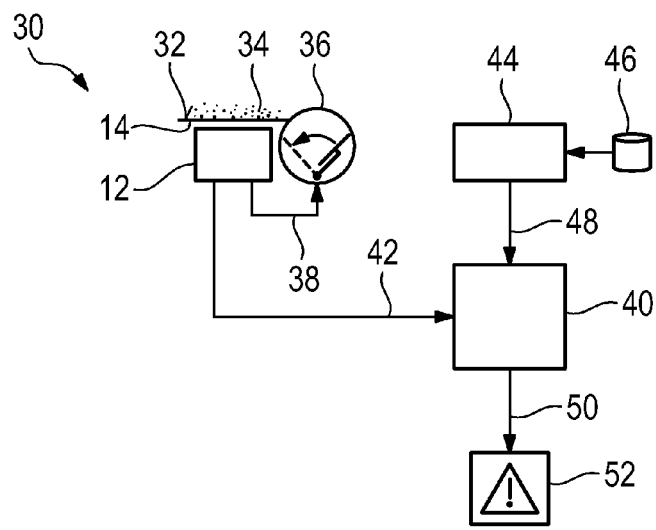
FIG. 2 is a schematic block diagram of the device for detecting wetness on the roadway.

A device for detecting the wetness 18 on the roadway 20 is illustrated schematically in FIG. 2 and is denoted generally by 30. The detection device 30 has the rain sensor 12 that is assigned to the rear windshield 14 and is designed to detect moisture 34 on a surface 32 of the rear windshield 14. The rain sensor 12 is connected to a wiper controller 36 that actuates the rear wiper 16 in accordance with a signal 38 from the rain sensor 12 and sets an interval period of the rear wiper 16. Thus, the rear wiper 16 can wipe the surface 32 of the rear windshield 14 in a way that is adapted to the moisture and oriented to demand, and can correspondingly remove the moisture 34 from the surface 32 of the rear windshield 14.

The detection device 30 also has an evaluation unit 40 that is connected to the rain sensor 12 and receives a moisture value 42 corresponding to the measured moisture 34. The moisture generated by spray on the rear windshield, and therefore the results of the rain sensor 12, are heavily dependent on the speed at which the vehicle is traveling. Thus, a speed-dependent characteristic curve specific to the vehicle type can be stored in the evaluation unit 40 so that the speed-dependent effect can be compensated. The detection device 30 also has a position-detection unit 44 to determine a current position of the motor vehicle 10, for example on the basis of GPS signals. The position-detection unit 44 can determine the current position of the motor vehicle 10 in map data that stores information on the roadway 20. The roadway information contains information about a probability of aquaplaning occurring and/or information on the quality of the roadway. These data have an effect on the aquaplaning and increase or reduce the probability of aquaplaning. This roadway information is called by the position-detection unit 44 from a data memory 46, such as a DVD, or from an external database 46 via a radio link. The information on the roadway 20 obtained in this way is made available as data 48 to the evaluation unit 40 by the position-detection unit 44. The evaluation unit 40 uses the data from the position-detection unit 44 and the moisture value 42 to determine the wetness 18 on the roadway 20 and determines a risk or probability of aquaplaning. The wetness 18 on the roadway 20 or the information about the risk of aquaplaning determined in this way is output by the evaluation unit 40 as an output signal 50 and can be available to a driving assistance system 52 that outputs a warning signal to the driver or generally intervenes in a vehicle controller to prevent the motor vehicle 10 from veering off.

In the data 48 it is possible to pass on, from the position-detection unit 44 to the evaluation unit 40, information that forms a measure of the spray values or the moisture values 42 from which the risk of aquaplaning at the current position of the motor vehicle 10 starts. These values can be stored as simple threshold values for different positions and can be based, for example, on conditions of the roadway or empirical values.

The evaluation unit 40 also is designed to estimate in a predictive fashion aquaplaning hazard situations that are present on a subsequent route. As a result, aquaplaning hazard situations that are present on the subsequent route with respect to the current position also are taken into account at a correspondingly early time.

The rain sensor 12 on the rear windshield 14 therefore can reliably determine the wetness 18 on the roadway 20 with simple means and, together with the data 48 and information about the roadway 20, can give a reliable indication of the risk of aquaplaning.

Of course, the wiping interval of the evaluation unit 40 set by the wiper controller 36 also can be made available as a measure of the moisture 34 on the rear windshield 14.

Figure 3:
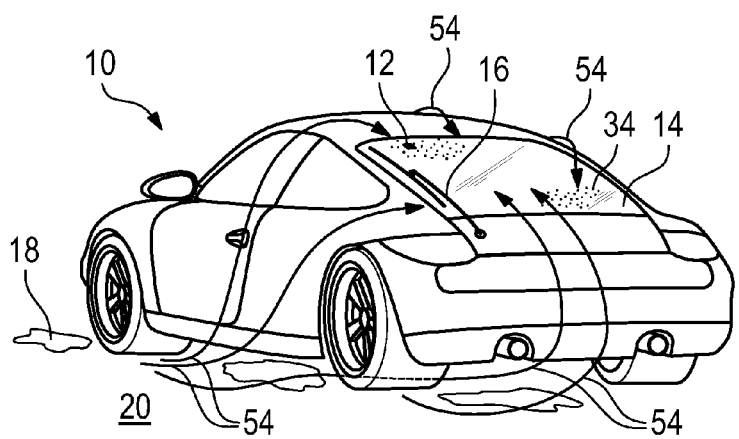
FIG. 3 is a perspective illustration of the motor vehicle for explaining the method of functioning of the device from FIG. 2.

FIG. 3 is a perspective illustration of the motor vehicle 10 with the detection device 30 for explaining the method of functioning in general. Identical elements are denoted by the same reference symbols, with only the special features being explained.

The wetness 18 on the roadway 20 is thrown up by the tires of the motor vehicle 10. As a result, the wetness 18 is precipitated as spray on a rear region of the motor vehicle 10, as is indicated by arrows 54, and is precipitated on the rear windshield 14 to form the moisture 34 that is detected by the rain sensor 12. The rain sensor 12 supplies, on the basis of the precipitated moisture 34, the moisture value 42 to the evaluation unit 40 which, together with the roadway information at the detected current position of the motor vehicle 10, determines a risk of aquaplaning. Thus, intervention can be carried out into the control of the vehicle by means of the driving assistance system 52 or a corresponding warning signal can be issued to the driver.

The combination of the measurement of moisture by the rain sensor 12 and the roadway information that marks locations critical for aquaplaning on a map, permits a warning about aquaplaning to be issued reliably with low technical expenditure.

What is claimed is:

1. A device for determining a risk of aquaplaning of a motor vehicle on a roadway, the motor vehicle having a rear windshield, the device comprising:
    a position detection unit for determining a current position of the vehicle on a roadway and for identifying roadway information at locations subsequent to the current position of the vehicle on the roadway;
    a moisture-detection unit on the rear windshield; and
    an evaluation unit configured: to determine wetness on the roadway based on a moisture value detected by the moisture-detection unit, to determine an aquaplaning risk at the locations subsequent to the current position of the vehicle on the roadway based on the moisture value detected by the moisture-detection unit and the roadway information identified by the position detection unit at the locations subsequent to the current position of the vehicle on the roadway, and to generate a signal indicative of the aquaplaning risk determined based on the moisture value and the roadway information at the locations subsequent to the current position of the vehicle.

2. The device of claim 1, wherein the position-detection unit is designed to call the roadway information from a database or a data memory and make the roadway information available to the evaluation unit.

3. The device of claim 1, wherein the roadway information comprises information relating to aquaplaning properties of the roadway.

4. The device of claim 1, wherein the roadway information has a threshold value for the moisture value.

5. The device of claim 1, wherein the signal generated by the evaluation unit is a warning signal issued to a driver of the vehicle on the basis of the determined wetness.

6. The device of claim 1, wherein a bodywork of the motor vehicle is configured so that spray water of the motor vehicle is precipitated on the rear windshield.

7. The detection device of claim 1, wherein the moisture-detection unit has a wiper element configured to remove the moisture from the rear windshield.

8. A method for detecting a risk of aquaplaning of a vehicle on a roadway, comprising:
    using a position detection unit for determining a current position of the vehicle on the roadway and for identifying roadway information at locations subsequent to the current position of the vehicle on the roadway
    using a sensor unit at a rear windshield of the motor vehicle for detecting a moisture value;
    determining the wetness on the roadway on the basis of the detected moisture value;
    determining an aquaplaning risk at the locations subsequent to the current position of the vehicle on the roadway based on the determined wetness on the roadway and the roadway information identified by the position detection unit at the locations subsequent to the current position of the vehicle on the roadway; and
    generating a signal indicative of an aquaplaning risk above a threshold value.

9. The device of claim 7, wherein the wiper element includes a wiper controller that sets a wiping interval based on the moisture value sensed by the moisture-detection unit, the evaluation unit receiving a signal indicative of the wiping interval and analyzing the wiping interval as a factor for determining the wetness on the roadway.

10. The device of claim 1, wherein the evaluation unit determines the aquaplaning risk as a function of vehicle speed.

11. The device of claim 10, wherein the evaluation unit has a storage that stores at least one speed-dependent characteristic curve specific to the vehicle.

12. The device of claim 1, wherein the signal is an intervention signal that causes the evaluation unit to intervene in at least one vehicle operation in response to an aquaplaning risk above a selected threshold value.

13. A motor vehicle, comprising:
    an upward and rearward facing rear windshield aligned at an acute angle to a roadway surface on which the vehicle is supported;
    a wiper element mounted in proximity to the rear windshield and operative to wipe moisture from the rear windshield;
    a moisture-detection unit on the rear windshield at a position that aligns with the wiper element when the wiper element is operated to wipe moisture from the rear windshield; and
    an evaluation unit configured to determine wetness on the roadway based on a moisture value detected by the moisture-detection unit, and to generate a signal indicative of a speed dependent risk based on the moisture value and a speed of the vehicle.

14. The motor vehicle of claim 13, further comprising a position detection unit for determining a current position of the vehicle on a roadway and for identifying roadway information at locations subsequent to the current position of the vehicle on the roadway, and wherein the evaluation unit is configured to determine an aquaplaning risk at the locations subsequent to the current position of the vehicle on the roadway based on the moisture value detected by the moisture-detection unit and the roadway information identified by the position detection unit at the locations subsequent to the current position of the vehicle on the roadway, and to generate a signal indicative of the aquaplaning risk determined based on the moisture value and the roadway information at the locations subsequent to the current position of the vehicle.

15. The motor vehicle of claim 14, wherein the position-detection unit is designed to call the roadway information from a database or a data memory and make the roadway information available to the evaluation unit.

16. The motor vehicle of claim 13, wherein the evaluation unit has a storage that stores at least one speed-dependent characteristic curve specific to the vehicle.

* * * * *